United States Patent
Myrah et al.

(10) Patent No.: US 8,856,404 B2
(45) Date of Patent: Oct. 7, 2014

(54) PRIMITIVE GROUP DATA ENCODING IN A DATA STORAGE FABRIC

(75) Inventors: Michael G Myrah, Cypress, TX (US); Balaji Natrajan, Spring, TX (US); Sohail Hameed, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 63 days.

(21) Appl. No.: 13/563,197

(22) Filed: Jul. 31, 2012

(65) Prior Publication Data

US 2014/0040291 A1 Feb. 6, 2014

(51) Int. Cl.
*G06F 13/14* (2006.01)

(52) U.S. Cl.
USPC ............... 710/38; 710/31; 710/3; 710/29

(58) Field of Classification Search
None
See application file for complete search history.

(56) References Cited

U.S. PATENT DOCUMENTS

| | | | |
|---|---|---|---|
| 6,629,166 B1 * | 9/2003 | Grun | 710/36 |
| 7,013,379 B1 * | 3/2006 | Testardi | 711/206 |
| 7,401,171 B2 * | 7/2008 | Slutz et al. | 710/104 |
| 7,404,013 B1 * | 7/2008 | Masiewicz | 710/5 |
| 7,412,540 B2 | 8/2008 | Seto et al. | |
| 8,595,408 B2 * | 11/2013 | Uddenberg et al. | 710/316 |
| 2006/0015774 A1 | 1/2006 | Nguyen et al. | |
| 2006/0136666 A1 | 6/2006 | Pang et al. | |
| 2007/0274231 A1 * | 11/2007 | Marks et al. | 370/254 |
| 2011/0106997 A1 | 5/2011 | Romero et al. | |
| 2013/0007306 A1 * | 1/2013 | Myrah et al. | 710/16 |
| 2013/0007318 A1 * | 1/2013 | Sarkar et al. | 710/74 |
| 2013/0304943 A1 * | 11/2013 | Pinglikar et al. | 710/15 |

OTHER PUBLICATIONS

Seagate Technology LLC, "Serial Attached SCSI (SAS)" Product Manual, Interface Manual, Rev. C, pp. 252 (Dec. 2009).

* cited by examiner

*Primary Examiner* — Cheng-Yuan Tseng (57) ABSTRACT

A method of extending a standard primitive in a data storage fabric is disclosed. A group of primitives are combined into a sequence including the standard primitive and a variable information primitive. The variable information primitive includes data particular to a broadcast of the sequence. The sequence is broadcast through the data storage fabric.

20 Claims, 4 Drawing Sheets

PRIMITIVE GROUP DATA ENCODING IN A DATA STORAGE FABRIC

BACKGROUND

In data storage technology, Small Computer System Interface, or SCSI, is a set of standards for physically connecting and transferring data between computers and peripheral devices. The SCSI standards define commands, protocols, and electrical and optical interfaces. SCSI is often used for hard disks and tape drives, but it can connect a wide range of other devices, including scanners and optical disc drives. The SCSI standard defines command sets for specific peripheral device types; the presence of "unknown" as one of these types means it can be used as an interface to almost any device, but the standard is (pragmatic) and addressed toward commercial applications such as Redundant Array of Independent Disks, or RAID.

Since the public introduction of SCSI in 1981, there have been seven generations of the parallel SCSI protocol. Each generation essentially doubled the bandwidth of the previous one, primarily by doubling the bus clock frequency. But as the bus frequency was increased with each new generation, so did the negative impact of bus contention, signal degradation, and signal skew, i.e., slight signal delays from one wire trace to the next. After the development of Ultra320 SCSI standard with a bandwidth of 320 MB/s per channel, further bandwidth improvements to parallel SCSI may be difficult without developing new and expensive technologies.

Serial Attached SCSI, commonly referred to as SAS, is a relatively recently-developed computer bus used to move data to and from computer storage devices. SAS was later transferred to the InterNational Committee for Information Technology Standards (INCITS) T10 to become an American National Standards Institute, or ANSI, and International Organization for Standardization/International Electrotechnical Commission, or ISO/IEC, standard. SAS uses a point-to-point serial protocol that replaces the parallel SCSI bus technology in data centers and workstations. SAS applies the command set from parallel SCSI, frame formats and full duplex communication of Fibre Channel. Also, SAS uses the Serial Advanced Technology Attachment, often abbreviated Serial ATA or simply SATA, interface for compatibility and investment protection. The SAS architecture addresses the parallel SCSI problems of bus contention, clock skew, and signal degradation at higher signaling rates, and can provide performance headroom in enterprise storage applications over SCSI.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

Figure 1:
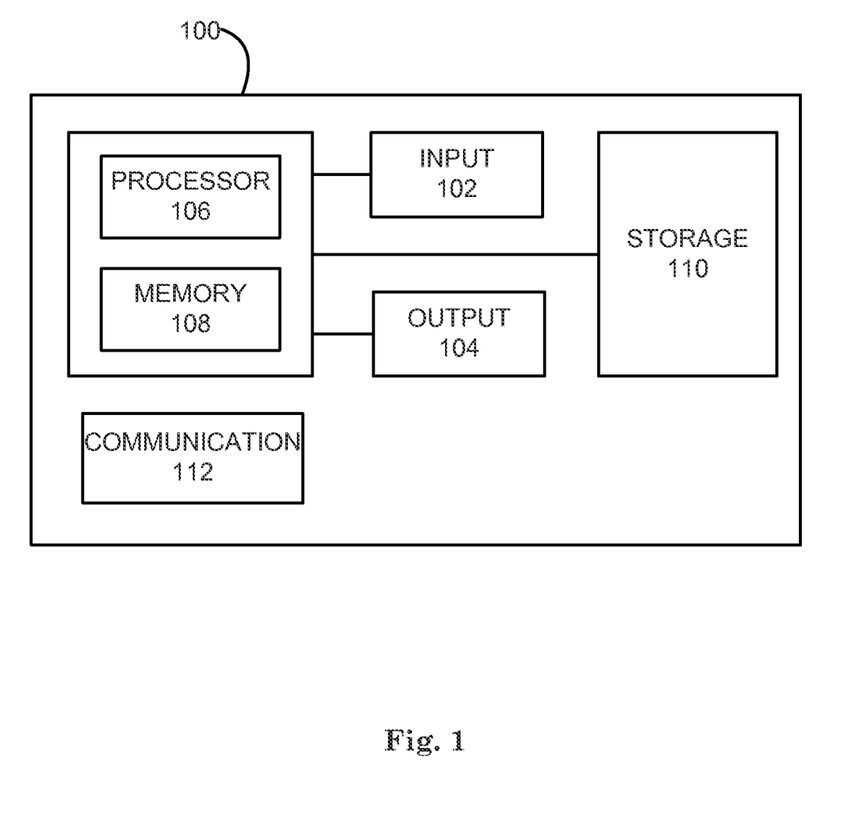
FIG. 1 is a block diagram illustrating an example of a computing device.

FIG. 1 illustrates an embodiment of a computer system and includes a computing device 100 that is employed in an SAS domain and used to perform the features of primitive data encoding. The computing device 100 can include a server, mobile device, gaming system, computer peripheral, interchangeable disk drive, or other device, and is not intended to be limited to a particular class of devices known as computers. In one example, the computing device 100 can include or can be coupled to one or more input devices 102, such as keyboard, pointing device (e.g., mouse), voice input device, touch input device, or other input connection. Computing device 100 can also include or can be coupled one or more output devices 104, such as a display, printer, or other output connection. In a basic configuration, computing device 100 typically includes a processor architecture having at least one processing unit, i.e., processor 106, and memory 108. Depending on the configuration and type of computing device, memory 108 may be volatile, non-volatile, or some combination of the two. The memory 108 can be arranged in a memory hierarchy such as a cache. Computing device 100 can also include additional storage 110 including, but not limited to, magnetic or optical disks or solid state memory, or flash storage devices for storage of information such as computer readable instructions, data structures, program modules or other data. The computing device 100 can be configured to run non-transitory computer readable instructions such as firmware from a tangible storage media and an operating system software program that can be stored on the storage media or memory as well as one or more software applications including firmware, which make up a system platform.

Memory 108 and storage 110 are examples of computer storage media that can be used to store the desired information and that can be accessed by computing device 100 or by other devices. Computer storage media can be part of computing device 100. Computing device 100 can also include one or more communication connections 112 that allow the computing device 100 to communicate with other devices on a network such as the Internet or a data storage fabric.

Figure 2:
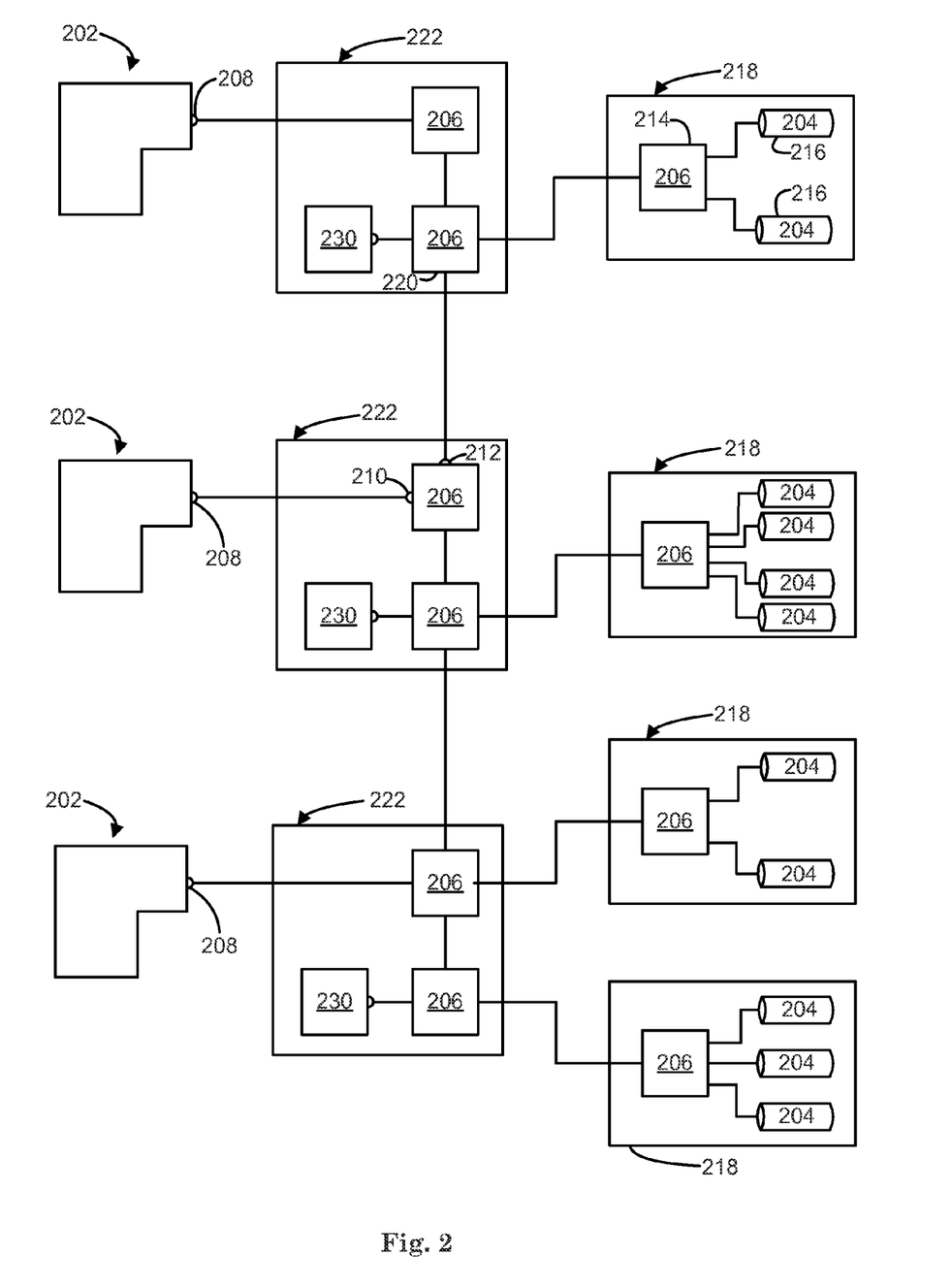
FIG. 2 is a schematic diagram illustrating an example of an SAS fabric that can be configured to employ computing devices such as the computing device of FIG. 1.

FIG. 2 illustrates an example SAS fabric, or SAS domain 200. SAS is a point-to-point architecture that transfers data to and from SCSI storage devices by using serial communication. In general, an SAS domain is an input/output (I/O) system having of a set of SAS devices that communicate with one another by means of a service delivery subsystem. SAS devices in the SAS domain 200 provide reliable, high-speed serial communication. In general, SAS device include initiators 202, targets 204, and expanders 206, which can be considered a type of computing device 100. Each SAS device has a unique worldwide name, or SAS address, which identifies an initiator port, a target port, or an expander device, assigned at manufacturing to simplify its identification in a domain.

The initiator 202 is a host bus adaptor (HBA), or controller that at times may be a stand-alone device or can be included as a component in the computing device 100. The initiator 202 is attached to one or more targets 204, such as SAS hard disk drives, SATA hard disk drives, and SAS tape drives, to form an SAS domain. An initiator 202 often includes one or more of Serial SCSI Protocol (SSP) ports typically used to communicate with SAS drives, Serial ATA Tunneling Protocol (STP) ports typically used to communicate with SATA drives, and/or Serial Management Protocol (SMP) ports typically used to communicate with expanders 206 in an SAS domain.

An SAS initiator 202 typically includes multiple ports 208 for connection to internal targets, external targets, such as targets 204, or both. An internal target can include, for example, a RAID system including SAS or SATA drives included within the computing device 100, which can include a server. Each initiator port can have a single physical link, which can be referred to as a narrow port, or 2, 4, 8 or more physical links, which can be referred to as a wide port and are described below. SAS initiator ports can be connected to separate domains for fail-over redundancy. SAS hard drives (such as enterprise-class and midline devices) can have two narrow ports. Each port can reside in a different SAS domain to provide fail-over redundancy and load balancing. SAS hard drives leverage a common electrical and Physical connection interface with SATA hard drives. However, SATA hard drives, including solid-state drives, can have a single narrow port.

A PHY is an object in a device that is used to interface to other devices. A physical PHY is a PHY that includes a transceiver and electrically interfaces to a physical link to communicate with another physical PHY. A virtual PHY is a PHY that interfaces with a vendor-specific interface to another virtual PHY inside the same device. A PHY is a mechanism that contains a transceiver that electrically interfaces to a physical link. In one example, a physical link includes two differential signal pairs, one pair in each direction, to connect together two physical PHYs. A wide port includes more than one PHY, and a wide link is a group of physical links that attaches a wide port to another wide port. In the example fabric 200, PHYs are included in the disk drive bays, rather than the drives themselves, as the drives can be easily interchanged.

Expanders 206 are high-speed switches that scale the number of targets 204 attached to an initiator 202, thereby creating a larger SAS domain 200. Expanders 206 establish connections between initiators 202, targets 204, and other expanders 206 by receiving commands and data in one port, such as a port 210 proximal to the initiator 202, and routing them to another port, such as port 212 distal to the initiator 202, based on the SAS address of the target 204. In some examples, an expander 214 includes a port distal to the initiator 202 directly coupled to a target 216, such as within a storage enclosure 218 and can be referred to here as an enclosure expander 214. The storage enclosure 218 can include multiple targets 216 and a storage enclosure processing system 220 in addition to the enclosure expander 214. In other examples, an expander 222 includes a port distal to the initiator 202 directly coupled to another expander 206 and can be referred to here as a switch expander 222. In the illustrated example, the initiator 202 is coupled to switch expander 222 that is coupled to an enclosure expander 214 that is coupled to the targets 216.

Expanders 206 use three routing methods—direct, table, and subtractive. An expander, such as enclosure expander 214, uses direct routing to forward commands and data to targets 216 directly attached to the enclosure expander 214. An expander, such as switch expander 222, uses table routing to forward commands and data to another expander, such as enclosure expander 214 or to another switch expander (not shown). Table routing is used for identifying devices connected to the expanders connected to a device's own PHY. When an expander 206 receives an address that it does not recognize, it uses subtractive routing to forward the commands and data to another expander 206 that does recognize the address.

Many storage networks can be implemented with just a set of typical SAS switch expander 222 (such as 16 ports as currently used), but there are some larger customers that would prefer to have double or triple the amounts of ports as typical switch expander 222. To meet the demands of large storage networks, two or more typical switch expanders 222 can be trunked together, or formed as a daisy chain, to enlarge the SAS fabric 200. In one example, a switch expander 222 proximate to an initiator 202 can have a port distal to the initiator 202 coupled to another switch expander at a port proximal to the initiator 202. Trunking can continue in this manner until the SAS fabric 200 is configured to meet the demands of the user. SAS fabrics 200 can be initially configured with trunked switch expanders 222, switch expanders 222 can be later trunked to incrementally scale the network, or a combination of the two.

The number of SAS devices in a given domain 200 is limited only by the size of the expander routing tables, but managing a large number of devices can be complicated. Zoning is a management tool included in the SAS standard, such as SAS-2 and above, to provide for traffic management and security. Second-generation SAS (SAS-2) link speed doubles the physical link rate to 6.0 Gb/s. SAS-2 eliminates the distinction between fanout and edge expanders with self-configuring expanders. SAS-2 is backward compatible with SAS-1. SAS-2 also enables zoning for enhanced resource deployment flexibility, security, and data traffic management.

Through the use of zoning, large physical topologies can be broken into logical groups such as zone groups, which are a set of PHYs in a zone that all have the same access permission. A group of zoning-enabled expanders that cooperate to control access between PHYs is known as a zoned portion of a service delivery system (ZPSDS). Examples of zoning include 128 or 256 zone groups numbered from 0 to 127 or 0 to 255, respectively. Zone groups 0 through 8 are pre-defined in the SAS standard. Devices in zone group 0 can only access devices in zone group 1, while devices in zone group 1 are allowed access to all zone groups. For example, a system administrator can use zone group 0 for a new (unassigned) device that is added to a ZPSDS. The administrator can also use zone group 1 for topology discovery and zone management. In one example, one ZPSDS is created per fabric 200.

Permission tables in SAS expanders 206 control zoning. An end device does not require any special features to operate within a zoned SAS domain, which makes legacy SAS and SATA devices compatible. An end device in a zone can interface with other end devices in the domain as permitted by the zoning expander. The SAS-2 standard permits zoning, a secure zoning method that uses the unique identifier (ID) number of each expander PHY. In zoning, each port of a zoning expander is assigned to a zone group, and any device attached to one of the ports becomes part of that respective zone group. Devices within a zone group can interact with each other. The permission table in the expander controls access between devices in different zone groups. If an attached device changes, the expander may be configured to set the zone group to 0, or no access, which allows an address-resolved-like policy to be implemented. For example, if a particular SAS device address includes certain permissions and the device is moved to a different expander in the fabric, then the zone manager can reprogram the zone group at the new location.

A zone manager 230 is responsible for configuring each zone. The zone manager 230 can control a zone by using an end device that has an SAS port connected to one of the zoning expanders. The zone manager 230 can also control a zone through a sideband interface (such as Ethernet) on one or more zoning expanders. The zone manager 230 assigns zone groups to all zoning expander PHYs, and it assigns all PHYs in a wide port to the same zone group. The zone manager 230 stores the zoning assignment of each expander PHY along with SAS addresses in the zoning expander's route table. Inside a particular ZPSDS, the zone manager assigns each zoning expander PHY attached to another zoning expander PHY to zone group 1. PHYs in zone group 1 have access to PHYs in all zone groups. The zone manager 230 assigns each zoning expander PHY on the boundary of the ZPSDS to a zone group other than group 1. The ZPSDS boundary is defined by designating expander PHYs as "not trusted" when connected to end devices outside the zone. Each zoning expander device also contains a zone permission table that controls whether a connection is allowed between PHYs in different zone groups.

In the SAS domain, DWORDS are transmitted over physical links to communicate with other devices on the data storage fabric. The DWORDS are either data or primitives. Primitives are DWORDS having a first character, i.e., the control character, of K28.5 and whose remaining three characters are data characters with correct disparity. Primitives having other control characters are known, such as K28.3 primitives that are used inside STP connections, but the examples below relate to extending the K28.5 primitives to support group encoding.

Standard primitives at times can be overly broad and can cause inefficiencies if they affect more of the fabric than practical. Many examples are found, but one such example can occur when a disk drive is removed or added, or linked down, to an expander 206. As a result of a drive removed or added, a primitive is transmitted to convey this information throughout the fabric so devices in the data storage fabric can perform discovery. The expander 206 transmits a sequence of primitives out all of its PHYs. If the expander 206 is attached to another PHY, the expander 206 will forward the sequence to the attached PHY or PHYs. A change in the configuration of the fabric 200, such as the disk drive being removed or added, will cause the expander 206 to originate a BROADCAST primitive, or BROADCAST(CHANGE). The SAS standard provides that expanders 206 will rebroadcast the primitive out of all PHYs that did not originate the BROADCAST primitive. The BROADCAST primitive causes initiator ports and expander ports to run, or re-run, standard discovery to search for the initiators 202, targets 204, and expanders 206 on the fabric 200.

The initiators 202 begin their respective discovery routines when the BROADCAST primitive is detected. In this standard discovery, the discovery routines are often run concurrently with each other and in a nondeterministic order throughout the entire fabric 200. In larger data storage fabrics, a BROADCAST primitive in a large data storage fabric can lead to the many discovery routines and also a lack of order in the discovery routines can lead to inefficiencies and errors, particularly when much of the fabric 200 or zone may not even be affected by the particular change in configuration that caused the broadcast of the primitive.

This disclosure provides for a transmitter to encode and send specific information via primitives to a receiver in a SAS fabric to address the inefficiencies and errors of an overly broad primitive. This improves over standard primitives in that variable information can be transmitted across SAS fabrics. For example, the transmitter could encode information in order to perform a targeted discovery process involving just affected initiators and other devices rather than a standard discovery.

Figure 3:
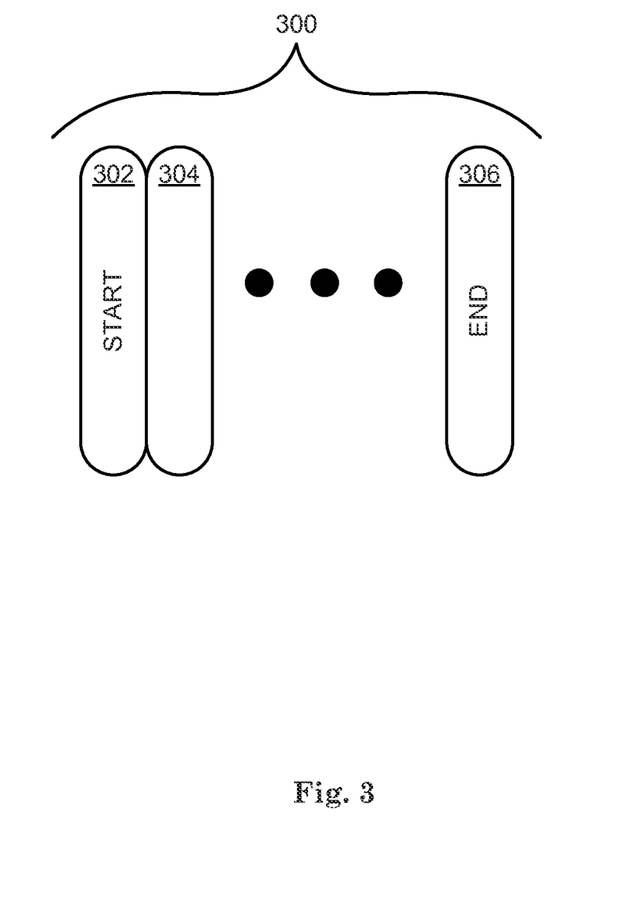
FIG. 3 is a schematic diagram illustrating an example of a primitive group having encoded data for use with the SAS fabric of FIG. 2.

FIG. 3 illustrates an example structure of a sequence of primitives 300 that can be used to extend the K28.5, or the like, standard primitives. For example, the first primitive 302 of the sequence 300 is a START OF SEQUENCE primitive that devices in the data storage fabric 200 recognize as the beginning of a primitive sequence. A number of different primitive sequence formats 304 can follow the first primitive 302. For example, a primitive that notifies the target how many more primitives are coming in the sequence may follow in the sequence. Another example of a subsequent primitive might specify a subtype sequence that has predefined known primitive-sequence length with known meanings of each primitive. The last primitive 306 of the sequence 300 is an END OF SEQUENCE primitive that may contain a type of error detection data such as a cyclic redundancy check, or CRC.

The primitive sequence 300 can specify particular information by encoding data that specifies a particular action that is different, such as less general, than an action available in the standard primitive. In one example, the sequence of primitives can create a proprietary broadcast sequence that specifies a particular SAS address of to allow initiators to know exactly what changed in the SAS fabric. In one example, the SAS address is a hash of the source SAS address to a proprietary BROADCAST (CHANGE) primitive. The initiator affected can order a targeted discovery if the address applies, such as the address is zoned to the initiator, or the initiator can ignore the primitive sequence if the address does not apply and not order discovery.

The primitive sequence 300 is distinguishable from other types of primitive sequences already defined in the SAS specification. These primitive sequence types include Single, Repeated, Continued, Extended, Triple, and Redundant. These sequences are not used for group data encoding as described in the example, and in most cases are intended to add redundancy. As an example, the CLOSE (NORMAL) Triple primitive sequence is sent thrice, but the receiver will not consider the primitive detected until it has been received three times. An Extended primitive, such as AIP, is transmitted three times and received one time. A Redundant primitive, such as BROADCAST(CHANGE) is transmitted six times and received three times. These primitive sequence types are generally for redundancy to prevent a false connection closure or the like, and are not used to specify additional information not already included in the standard primitive.

Figure 4:
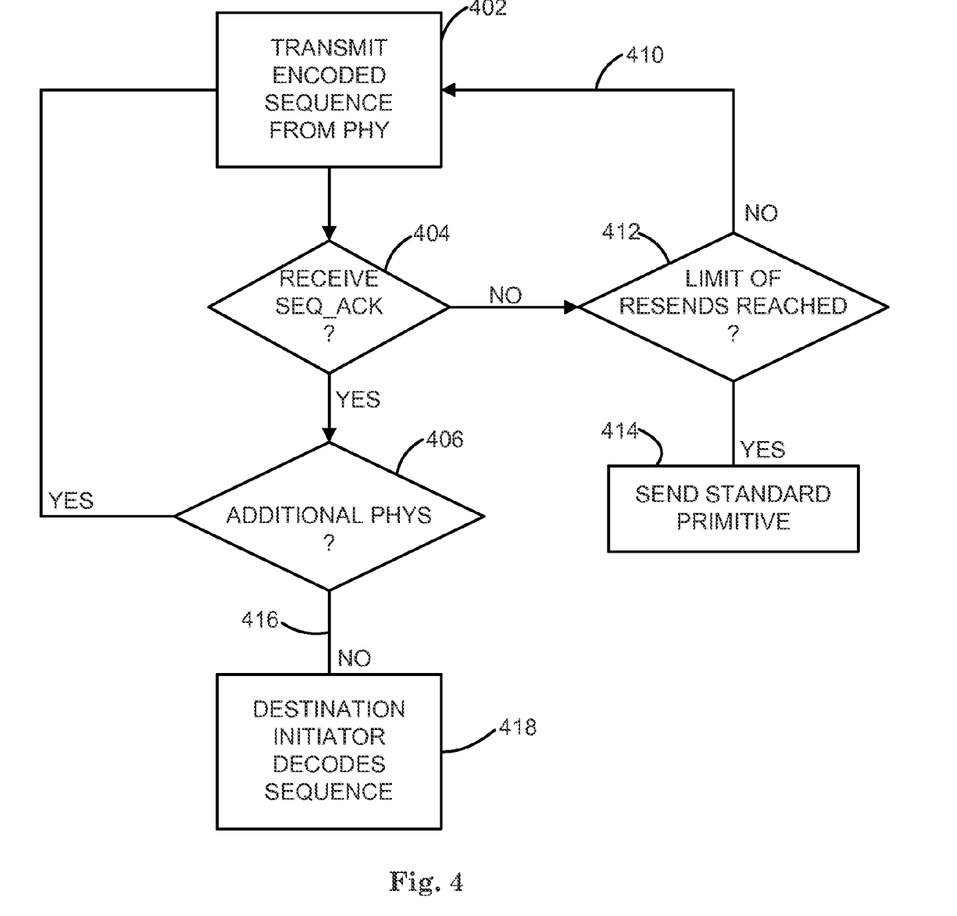
FIG. 4 is a block diagram illustrating an example of a method for sending a primitive sequence of FIG. 3 in the SAS fabric of FIG. 2.

FIG. 4 illustrates a process 400 for broadcasting the sequence of primitives in the SAS fabric 200. In the example, a disk drive is removed or added, or linked down, to an expander 206, and a sequence of primitives encoded with particular data is transmitted to convey this information throughout the fabric at 402 so devices in the data storage fabric can perform discovery. The expander 206 transmits a sequence of primitives out all of its PHYs. If the expander 206 is attached to another PHY, the expander 206 will buffer the entire sequence of characters and then forward the sequence to the attached PHY or PHYs.

Each device that successfully receives the sequence will return a SEQ ACK primitive on the PHY that received the sequence to the PHY that transmitted the sequence at 404. If the sequence is not received successfully, the device does not return any primitive to the PHY that transmitted the sequence. If the receiving device is an expander 206 and the sequence is received successfully, the expander then forwards the sequence to all of its PHYs at 406, and so on.

In certain circumstances, a PHY will fail to receive the sequence 408. If after a certain event or time period the device transmitting the sequence does not receive a SEQ ACK from a PHY, the transmitting device resends the sequence to that PHY at 410. If no SEQ ACK is received after a selected number of attempts at 412 the expander may either give up or in some cases fallback to more generic preexisting SAS primitive at 414. For example, if the sequence was to notify a particular change in the topology for a specific SAS address, the failing expander may fall back to a more general change of configuration primitive, such as a BROADCAST (CHANGE) primitive.

In some circumstances, multiple sequences may be transmitted through the data storage fabric. When an expander that is placed between an initiator 202 and the expander 206 that is originating the primitive sequence receives the START OF SEQUENCE primitive, it will let all that primitive sequence be buffered and forwarded completely through the expander before allowing another originating expander to pass through other primitive sequences. In this way the primitive sequences are kept from interleaving which would cause data corruption. The other sequences are buffered in the expander as well but transmitted only after the ongoing sequence is completed.

Once a destination initiator receives the primitive sequence at 416, the initiator decodes the data in the primitive sequence at 418. In general, each initiator will each determine if action is needed based on the decoded data. For example, if a primitive sequence returns a proprietary BROADCAST sequence that specifies a particular PHY has changed, the initiators can determine if that PHY is zoned to them, or if the PHY change even represents a concern. They can then, in the BROADCAST case, send a DISCOVERY command to the specific expander that had a PHY go down rather than doing a complete discovery process across the fabric. Of course, other uses are possible with the primitive sequence.

In another example, the primitive sequences can be encoded so as to be hidden from selected initiators. The expander could convert the primitive sequence to a standard SAS primitive and selectively send the SAS primitive to only certain initiators. For example, in the proprietary BROADCAST sequence, the expander could determine only certain attached end devices are affected by the hashed source address received as part of the sequence based on the zone permission, PHY zone and route table entries. It would then forward a standard SAS BROADCAST (CHANGE) primitive to the affected end devices.

Although specific embodiments have been illustrated and described herein, it will be appreciated by those of ordinary skill in the art that a variety of alternate and/or equivalent implementations may be substituted for the specific embodiments shown and described without departing from the scope of the present invention. Even though the examples are related to inefficiencies caused by discovery routines resulting from a broadcast of standard or proprietary primitives, other examples of standard or proprietary primitives creating inefficiencies or overly broad effects in an SAS domain are legion, and the disclosure is not intended to be limited to primitives involved in effecting discovery routines. It should be understood that the examples related to the specific functions of the example primitives can be readily applied to other types of primitives. This application is intended to cover any adaptations or variations of the specific embodiments discussed herein.

What is claimed is:

1. A method of extending a standard primitive in a data storage fabric having a plurality of computing devices coupled together to transmit information, the method comprising:
   combining a plurality of primitives into a sequence including the standard primitive and a variable information primitive, wherein the variable information primitive includes data particular to a broadcast of the sequence, wherein the data included in the variable information primitive is user-configurable and different than data in the standard primitive, and wherein the plurality of computing devices are capable of responding to the standard primitive; and
   broadcasting the sequence through the data storage fabric and processing the sequence with the plurality of computing devices;
   wherein the data in the variable information primitive is directed to a first computing device of the plurality of devices such that processing of the sequence with the first computing device causes the first computing device to perform a response to the standard primitive and wherein processing of the sequence with a second computing devices device in the plurality of computing devices causes the second computing device to ignore the standard primitive.

2. The method of claim 1 wherein the plurality of primitives includes a START OF SEQUENCE primitive.

3. The method of claim 2 wherein the START OF SEQUENCE primitive is a first primitive in the sequence.

4. The method of claim 2 wherein a primitive notifying a target in the data storage fabric of a number of primitives in the sequence follows the START OF SEQUENCE in the sequence.

5. The method of claim 1 wherein the plurality of primitives includes an END OF SEQUENCE primitive as the last primitive in the sequence.

6. The method of claim 5 wherein the END OF SEQUNCE primitive includes error detection.

7. The method of claim 6 wherein the error detection is a cyclic redundancy check.

8. The method of claim 1 wherein the variable information primitive includes an encoded address of a particular change in the data storage fabric.

9. The method of claim 8 wherein the data storage fabric is a Serial Attached Small Computer System Interface domain.

10. The method of claim 8 wherein the encoded address is a source data storage fabric address.

11. A method of extending a standard primitive in a data storage fabric having a plurality of computing devices coupled together to transmit information including a first computing device and a second computing device, the method comprising:
    combining a plurality of primitives into a sequence including the standard primitive and a variable information primitive, wherein the variable information primitive includes data particular to a broadcast of the sequence, wherein the data included in the variable information primitive is user-configurable and different than data in the standard primitive, and wherein the plurality of computing devices are capable of responding to the standard primitive;
    broadcasting the sequence through the data storage fabric and processing the sequence with the plurality of computing devices;
    wherein the data in the variable information primitive is directed to the first computing device such that processing of the sequence with the first computing device causes the first computing device to perform a response to the standard primitive and wherein processing of the sequence with the second computing devices device causes the second computing device to ignore to the standard primitive;
buffering the sequence at an expander; and
decoding the sequence at a target initiator.

12. The method of claim 11 wherein broadcasting the sequence through the data storage fabric includes sending the sequence to a receiving PHY and waiting for an acknowledgement primitive from the receiving PHY.

13. The method of claim 12 wherein failing to receive an acknowledgement primitive includes sending a standard primitive to the receiving PHY.

14. The method of claim 13 wherein the primitive sequence initiates a discovery in a particular expander and the standard primitive sent to the receiving PHY is a BROADCAST (CHANGE) primitive.

15. The method of claim 14 wherein the target initiator initiates the discovery.

16. The method of claim 15 wherein other initiators in the data storage fabric receiving the sequence do not initiate discovery.

17. The method of claim 15 wherein the target initiator is included in a plurality of initiators in the data storage fabric and each initiator of the plurality of initiators determines whether to perform an action in response to receiving the sequence.

18. A method of extending a standard primitive in a data storage fabric having a plurality of computing devices coupled together to transmit information including a first computing device and a second computing device, the method comprising:
combining a plurality of primitives into a sequence including the standard primitive and a variable information primitive, wherein the variable information primitive includes an encoded address in the data storage fabric the sequence,
wherein the data included in the variable information primitive is user-configurable and different than data in the standard primitive,
wherein the plurality of computing devices are capable of responding to the standard primitive
wherein the data in the variable information primitive is directed to the first computing device such that processing of the sequence with the first computing device causes the first computing device to initiate a discovery in response to the standard primitive and wherein processing of the sequence with the second computing devices device causes the second computing device to ignore to the standard primitive and not initiate a discovery, and
broadcasting the sequence through the data storage fabric.

19. The method of claim 17 including not broadcasting the sequence to an initiator in the data storage fabric.

20. The method of claim 17 wherein the sequence is not interleaved with another concurrently broadcast sequence through the data storage fabric.

* * * * *

UNITED STATES PATENT AND TRADEMARK OFFICE
CERTIFICATE OF CORRECTION

PATENT NO. : 8,856,404 B2  
APPLICATION NO. : 13/563197  
DATED : October 7, 2014  
INVENTOR(S) : Michael G Myrah et al.

Page 1 of 1

It is certified that error appears in the above-identified patent and that said Letters Patent is hereby corrected as shown below:

In the Specification

In column 2, line 55, delete "device" and insert -- devices --, therefor.

In the Claims

In column 8, line 23, in Claim 1, before "device" delete "devices".

In column 8, line 37, in Claim 6, delete "SEQUNCE" and insert -- SEQUENCE --, therefor.

In column 9, line 3, in Claim 11, before "device" delete "devices".

In column 10, line 7, in Claim 18, delete "fabric" and insert -- fabric of --, therefor.

In column 10, line 20, in Claim 18, before "device" delete "devices".

Signed and Sealed this  
Seventeenth Day of March, 2015

Michelle K. Lee  
*Director of the United States Patent and Trademark Office*